(12) United States Patent
Zavrel et al.

(10) Patent No.: US 11,550,062 B2
(45) Date of Patent: Jan. 10, 2023

(54) HIGH-GAIN MULTIBEAM GNSS ANTENNA

(71) Applicant: Isotropic Systems Ltd, London (GB)

(72) Inventors: Robert J. Zavrel, Spokane, WA (US); Jeremiah P. Turpin, Linthicum, MD (US); John Finney, London (GB)

(73) Assignee: ALL.SPACE NETWORKS LTD., Reading (GB)

( * ) Notice: Subject to any disclaimer, the term of this patent is extended or adjusted under 35 U.S.C. 154(b) by 0 days.

(21) Appl. No.: 17/125,681

(22) Filed: Dec. 17, 2020

(65) Prior Publication Data

US 2021/0208284 A1 Jul. 8, 2021

Related U.S. Application Data

(60) Provisional application No. 62/953,311, filed on Dec. 24, 2019.

(51) Int. Cl.
*G01S 19/37* (2010.01)
*G01S 19/21* (2010.01)
(Continued)

(52) U.S. Cl.
CPC ............ *G01S 19/215* (2013.01); *G01S 19/14* (2013.01); *G01S 19/23* (2013.01); *G01S 19/37* (2013.01); *H01Q 1/241* (2013.01)

(58) Field of Classification Search
CPC ............................... G01S 19/37; G01S 19/215
(Continued)

(56) References Cited

U.S. PATENT DOCUMENTS 7,193,560 B2   3/2007   Dooley et al.
7,345,652 B2   3/2008   Schaffner et al.
(Continued)

FOREIGN PATENT DOCUMENTS

EP   1085599 A2   3/2001
EP   1690107 A2   8/2006
(Continued)

OTHER PUBLICATIONS

A. Kumar, et al., "A Wide Band Antenna for Multi-Constellation GNSS and Augmentation Systems", Progress in Electromagnetics Research M, vol. 11, 2010, pp. 65-77.
(Continued)

*Primary Examiner* — Harry K Liu
(74) *Attorney, Agent, or Firm* — Hogan Lovells US LLP (57) ABSTRACT

A multibeam Radio Frequency (RF) lens antenna is designed as a receiver for Global Navigation Satellite System (GNSS) applications, such as GPS (Global Positioning System), Galileo, GLONASS, COMPASS, and others. The RF lens and plurality of associated feed elements and receiver circuits combine to form a plurality of resulting high-gain relatively narrow beams that, taken together, allow reception of signals from GNSS satellites over the entire upper hemisphere. Any kind of RF lens can be used, where the lens can be of homogeneous or inhomogeneous, dielectric or metamaterial metasurface construction. The benefit of this approach to build a GNSS receiver over existing alternatives is increased gain and decreased noise at each receiver, which improves the signal to noise ratio (SNR) and improves the accuracy and reliability of the position and time measurements, while also reducing the impact of, and sensitivity to, interference, jamming, and spoofing signals. The approaches described in this patent can be combined with existing signal processing and accuracy improvement methods (such as Real-Time Kinematic (RTK), Precise-Point Positioning (PPP), and Differential GPS (DEPS)) for further benefits. This system has applications within the surveying, maritime, land mobility, aerospace, and government positioning market areas.

16 Claims, 7 Drawing Sheets

(51) Int. Cl.
*G01S 19/14* (2010.01)
*G01S 19/23* (2010.01)
*H01Q 1/24* (2006.01)

(58) Field of Classification Search
USPC .......................................................... 342/352
See application file for complete search history.

(56) References Cited

U.S. PATENT DOCUMENTS

| | | | |
|---|---|---|---|
| 7,417,597 | B1 | 8/2008 | Lopez |
| 7,642,957 | B2 | 1/2010 | Lennen et al. |
| 7,683,830 | B2 | 3/2010 | Montgomery et al. |
| 7,760,136 | B2 | 7/2010 | Lawrence |
| 7,786,933 | B2 | 8/2010 | Chang |
| 7,859,461 | B2 | 12/2010 | Wengler et al. |
| 8,035,562 | B2 | 10/2011 | Chang |
| 8,044,847 | B1 | 10/2011 | Kling et al. |
| 8,044,857 | B2 | 10/2011 | Maenpa et al. |
| 8,089,402 | B2 | 1/2012 | Maenpa et al. |
| 8,125,384 | B1 | 2/2012 | Kling et al. |
| 8,154,445 | B2 | 4/2012 | Maenpa et al. |
| 8,232,918 | B2 | 7/2012 | Ohang |
| 8,583,315 | B2 | 11/2013 | Whitehead et al. |
| 8,665,152 | B1 | 3/2014 | Kling et al. |
| 8,674,874 | B2 | 3/2014 | Soualle et al. |
| 8,736,490 | B2 | 5/2014 | Simic et al. |
| 8,896,479 | B2 | 11/2014 | Wang et al. |
| 9,110,161 | B2 | 8/2015 | Waters et al. |
| 9,172,402 | B2 | 10/2015 | Gudem et al. |
| 9,356,358 | B2 | 5/2016 | Chang et al. |
| 9,435,893 | B2 | 9/2016 | Chang |
| 9,612,337 | B2 | 4/2017 | Floch |
| 9,612,342 | B2 | 4/2017 | Petersen |
| 9,651,666 | B2 | 5/2017 | Brekke |
| 9,671,499 | B2 | 6/2017 | Liu et al. |
| 9,689,989 | B2 | 6/2017 | Trautenberg et al. |
| 9,726,764 | B1 | 8/2017 | Heinrich |
| 9,766,341 | B2 | 9/2017 | Chamseddine |
| 9,778,367 | B2 | 10/2017 | Wang et al. |
| 9,778,368 | B2 | 10/2017 | Krantz et al. |
| 9,927,527 | B2 | 3/2018 | Weger et al. |
| 10,020,875 | B2 * | 7/2018 | Agarwal ............ H04W 72/0446 |
| 10,031,234 | B1 | 7/2018 | Alexander |
| 10,031,238 | B2 | 7/2018 | Navsariwala et al. |
| 10,054,687 | B2 | 8/2018 | Whitehead |
| 10,116,051 | B2 | 10/2018 | Scarborough et al. |
| 10,193,231 | B2 | 1/2019 | Wallace et al. |
| 10,288,742 | B2 | 5/2019 | Dickman et al. |
| 2012/0286992 | A1 | 11/2012 | Tekin et al. |
| 2012/0286994 | A1 | 11/2012 | Letestu et al. |
| 2014/0035783 | A1 | 2/2014 | Contarino et al. |
| 2014/0247186 | A1 | 9/2014 | Daneshmand et al. |
| 2015/0130678 | A1 | 5/2015 | Lee et al. |
| 2015/0346345 | A1 | 12/2015 | Bartone |
| 2016/0006129 | A1 * | 1/2016 | Haziza .................. H01Q 13/02 343/783 |
| 2016/0033648 | A1 | 2/2016 | Overbeck |
| 2016/0240923 | A1 * | 8/2016 | Oh ....................... H01Q 21/061 |
| 2017/0033458 | A1 | 2/2017 | Haziza |
| 2018/0115977 | A1 * | 4/2018 | Fujita ................... H04W 16/04 |
| 2018/0175507 | A1 * | 6/2018 | Diaz .................. H01Q 13/0241 |
| 2018/0183152 | A1 * | 6/2018 | Turpin ..................... G06F 30/20 |
| 2018/0239028 | A1 | 8/2018 | Ibendorf et al. |
| 2018/0288627 | A1 | 10/2018 | Ellum et al. |
| 2018/0299560 | A1 | 10/2018 | Zangvil et al. |
| 2019/0204451 | A1 | 7/2019 | Boyer et al. |

FOREIGN PATENT DOCUMENTS

| | | | | |
|---|---|---|---|---|
| EP | 2367026 | A1 | 9/2011 | |
| EP | 2589983 | A1 | 5/2013 | |
| EP | 3026462 | A1 | 6/2016 | |
| WO | WO-9962137 | A1 * | 12/1999 | ............ H01Q 15/02 |
| WO | WO-2014046538 | A1 * | 3/2014 | ............... H01Q 1/48 |
| WO | WO-2018/211356 | A1 | 11/2018 | |

OTHER PUBLICATIONS

D. S. De Lorenzo, et al., "Testing of Adaptive Beamsteering for Interference Rejection in GNSS Receivers", Proc. ENC, 2007, pp. 1277-1287.

Cuntz, M., et al. "A Multi Antenna Receiver for Galllep SoL Applications", IEEE MTT-S International Mini-Symposium on Electromagnetics and Network Theory and their Microwave Technology Applications, Oct. 9, 2008, 7 pgs.

Vagle N, Broumandan A, Jafarnia-Jahromi A, Lachapelle G. Performance analysis of GNSS multipath mitigation using antenna arrays. The Journal of Global Positioning Systems. Dec. 2016., 14(1):4.

J. J. H. Wang, "Antennas for Global Navigation Satellite System (GNSS)", Proceedings of the IEEE, vol. 100, No. 7, Jul. 2012, pp. 2349-2355.

International Search Report for PCT/IB2020/062250, dated Mar. 15, 2021, 13 pgs.

* cited by examiner

HIGH-GAIN MULTIBEAM GNSS ANTENNA

RELATED APPLICATION

This application claims the benefit of priority of U.S. Application Ser. No. 62/953,311 filed on Dec. 24, 2019, the content of which is relied upon and incorporated herein by reference in its entirety.

BACKGROUND

Achieving higher levels of position and time accuracy in less time has benefits in many industries and applications. Many of these approaches rely on new and improved signal processing techniques that extract the maximum possible amount of information from the weak and noisy signal. However, even better would be improving the quality of the signal itself, since the signal processing methods would all continue to add additional value.

The antenna is an important part of a Global Navigation Satellite System (GNSS) receiver, as the antenna determines how much of the signal is picked up and forwarded to the signal processing system. Many antennas are used for GNSS reception, but the vast majority are static, with a fixed radiation pattern. Improvements to the antennas focus on optimizing the radiation pattern to cover as much of the upper hemisphere as possible while minimizing the radiation pattern directed towards the ground or terrestrial sources of interference.

The Global Positioning System (GPS), as the first of the satellite-based positioning systems, has had many antenna designs created to fit one niche or another. Currently, antennas for GNSS fall into one of three general categories: Low-cost Fixed Radiation Pattern Antennas (FRPA); High-performance FRPA; and Controlled Radiation Pattern Antennas (CRPA).

Low-cost FRPA focus on optimizing the radiation pattern of a single radiating element, and will generally be low-cost and physically compact, but with low to moderate gain and angular performance. The largest concern with these antennas is mitigating interference from terrestrial sources near the horizon and backlobes, so balancing the gain in the upper hemisphere with sufficient rejection in the lower hemisphere on a small ground plane is often a challenge. These are the most common form of GNSS receiver antennas. Some of these antennas are integrated directly into the integrated circuit packaging or printed circuit board for more convenience but poorer performance.

High-performance FRPA use higher-quality materials and construction or additional structures and geometry to improve the patterns and phase center stability and reduce the sensitivity to interference of the basic single-element antennas. Often using the same patch or helix base, the high-performance antennas can improve performance with amplifiers, larger ground planes, structured ground planes (such as multilevel choke rings), or absorbing structures to control the backlobes, sidelobes, and boresight radiation patterns. These antennas are less common and are used primarily in high-precision applications such as surveying and precision timekeeping. The key benefit of this class of antenna is reduced sensitivity to reflected and multipath signals from the environment.

CRPA use multiple methods to allow dynamic changes to the hardware and signal processing system to alter the radiation patterns in response to real-time conditions. The purpose of changing the radiation pattern is to increase resilience to intentional or unintentional jamming or spoofing by placing a null in the radiation pattern at or near the angular source of the interference. Some CRPA systems use explicit phased array approaches with multiple receivers that combine the signals from number of feed elements (each of which might be similar to one of the ordinary FRPA mentioned above), and others use a single antenna but change the state of switches or excitation points to tilt, rotate, or otherwise alter the radiation pattern. These systems are almost exclusively used for military applications where jamming, spoofing, and interference is of strong concern.

The CRPA described to date have a number of benefits over more conventional FRPA, but are still limited in their achievable performance. Phased array implementations are typically limited to a small number of elements, and are typically used to perform null placement to isolate interferers rather than improve signal reception in general. The processing required to combine the signals from the different elements also drives the cost and complexity of the antenna.

This present system and method describes a new form of GNSS antenna that improves the signal strength and reduces the noise levels at the receiver by passively segmenting the sky into separate regions, reducing the error contribution and measurement uncertainty, and reducing the time required to a position measurement of a desired accuracy.

SUMMARY

The present system and method relate to the receiving of signals transmitted from satellites and ground infrastructure for determining position and time synchronized to one or more of the satellite positioning constellations (GPS, Galileo, GLONASS, etc.). Although there are some differences between the operation of the different systems, the same principles apply to all. A set of transmitters (in space or on the ground) with accurate, synchronized docks broadcast messages including the time of transmission and the position of the transmitter. Receivers on the ground independently collect and decode the messages from multiple transmitters and use the information to compute a time and position estimate based on triangulation methods. The accuracy that can be obtained with this approach is limited by position uncertainties of the satellites, the wavelength, and other properties of the transmitted signal, uncertainties as to the propagation characteristics of the atmosphere, the presence of unwanted noise and interference, and low signal strengths at the receiver. Even very poor reception can be mitigated, however, by gathering measurements over an extended period and averaging the results to help remove the impact of the time-varying error sources (although this does not assist with systemic errors).

Improving the signal strength with improved antennas is a key method of improving the accuracy of GNSS receivers for many applications, including (but not limited to) property and construction surveying, automated agricultural, mining, and construction equipment, navigation, self-driving vehicles, and defense and military vehicles.

DETAILED DESCRIPTION

In describing the illustrative, non-limiting embodiments of the system and method illustrated in the drawings, specific terminology will be resorted to for the sake of clarity. However, the system and method disclosed is not intended to be limited to the specific terms so selected, and it is to be understood that each specific term includes all technical equivalents that operate in a similar manner to accomplish a similar purpose. Several embodiments of the system and method are described for illustrative purposes, it being understood that the disclosure may be embodied in other forms not specifically shown in the drawings.

Multibeam Lens antennas offer advantages across many applications but have previously not been utilized for GNSS receivers. New advances in lens antenna architecture now permit smaller size, wider scan range, and multiple simultaneous beams across the field of view. This disclosure describes receiver architectures that utilize improved lenses to offer substantial advantages compared to the state of the art.

Figure 1:
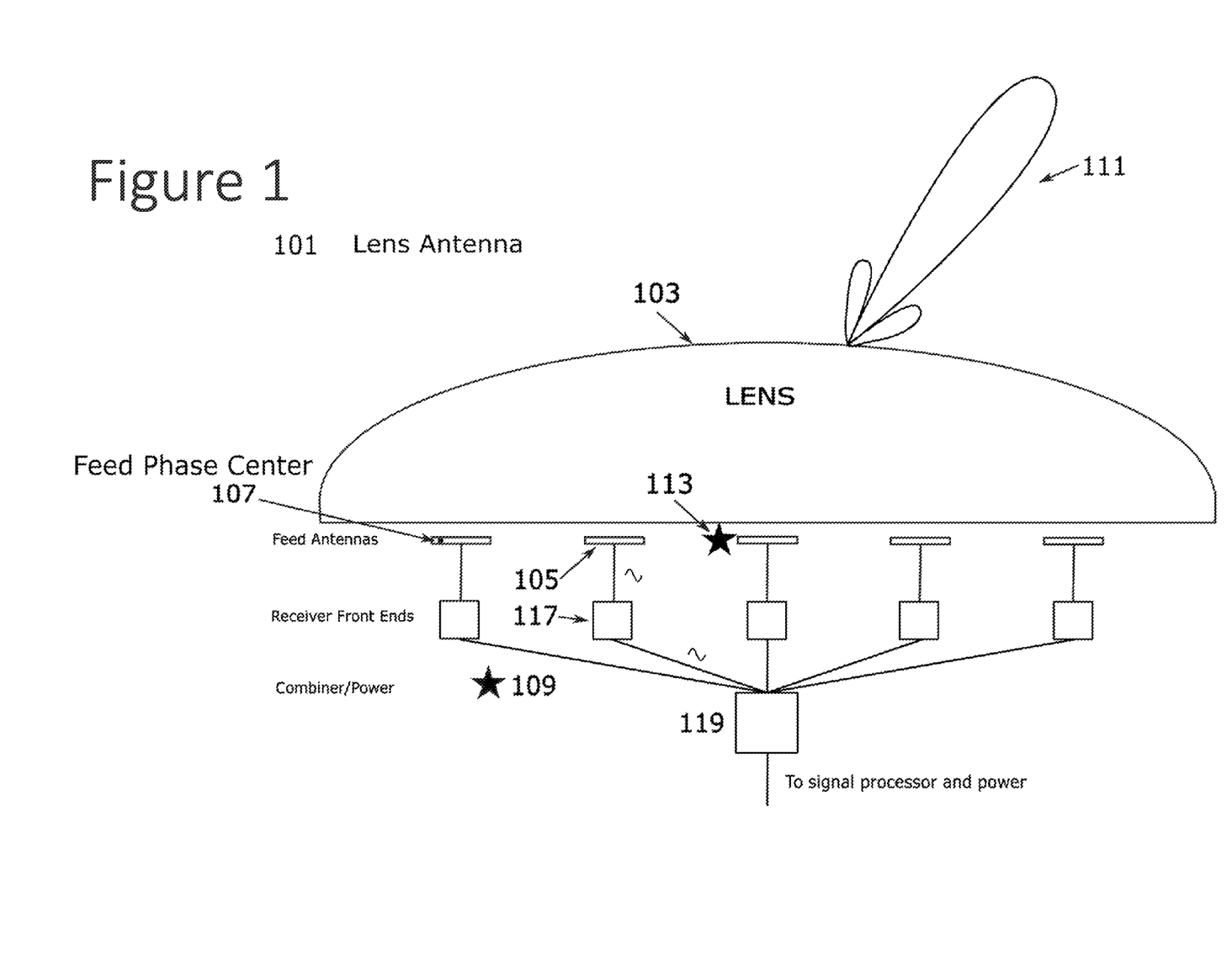
FIG. 1 shows a lens antenna unit.
Figure 2:
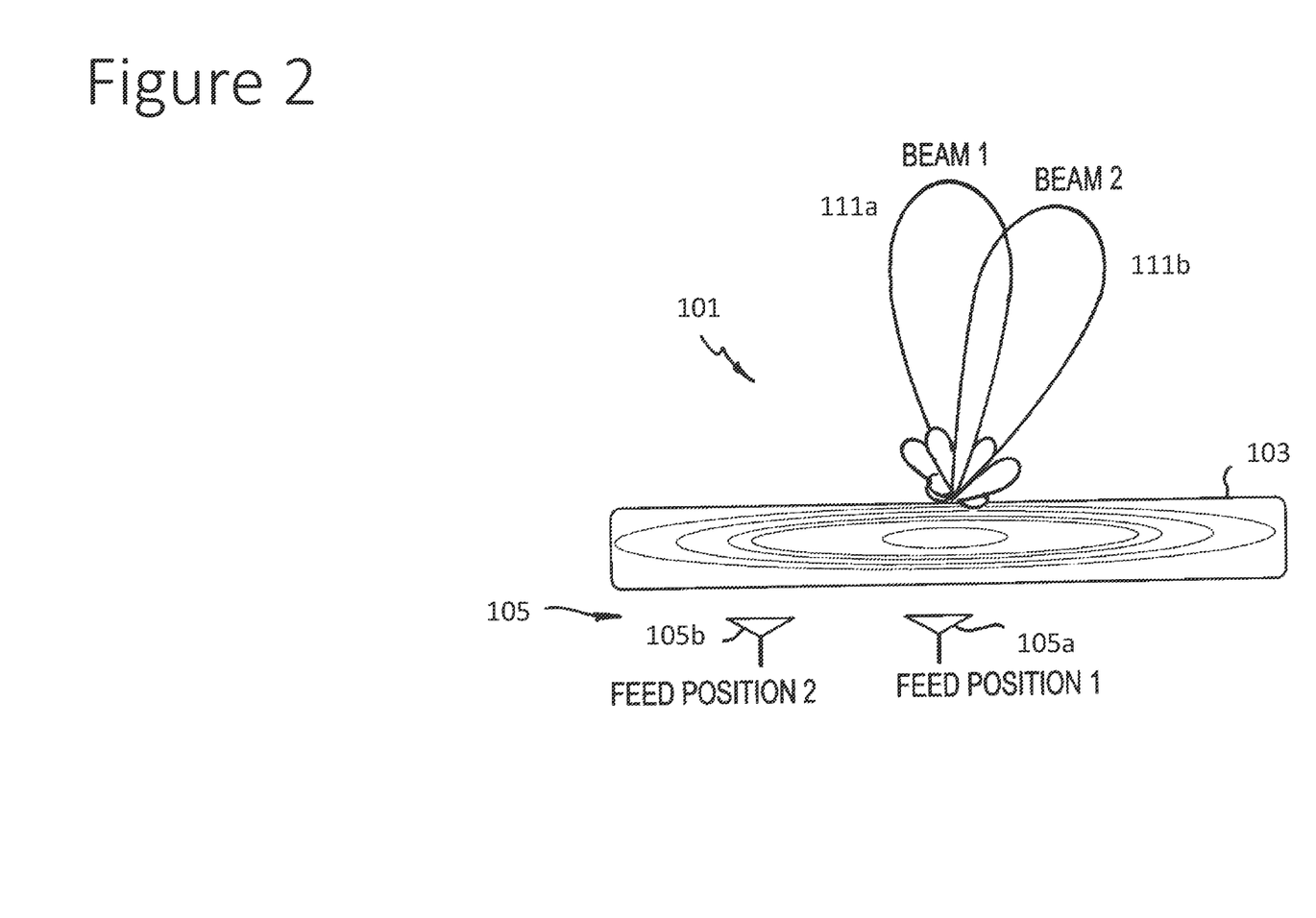
FIG. 2 shows a lens with two feed positions showing multiple beams.

Turning to the drawings, FIGS. 1, 2 show a lens antenna 101 having a lens 103 and a plurality of feeds 105, each with an associated receiver front end 117, and the signals from all of the feeds 105 and receivers 117 are combined and digitized by a digitizer such as in a combiner 119, Each feed, when enabled, produces a corresponding beam 111 from the single shared lens antenna 101 in a direction set by the position of the feed 105 (and the phase center 107 of each feed) relative to the focal point 113 of the lens 103. In this way, multiple beams share the same aperture, and multiple beam directions can come from the same physical region. The high gain of the lens compared to the gain of the feeds without the lens leads to each beam covering only a subset of the sky, while the set of all of the beams allows signals from the entire upper hemisphere to be received. The gain of the resulting beam 111 depends on the size and physical characteristics of the lens. The gain of the beam decreases in general with larger scan angles from boresight. Each beam is characterized by a distinct effective phase center 109, which is the physical point from which the energy of the beam appears to be emanating, and is affected by the lens and feed design. Stability of the phase center of each beam across frequency and coverage range of the beam is highly important for accurate positioning. Multiple feeds can be enabled simultaneously. In this case, enabling feeds 105a and 105b simultaneously produce separate beams 111a and 111b in different directions from the lens antenna 101.

The radio characteristics of the lens antenna 101 are defined by the combination of the lens 103 and the feed 105. For GNSS receiver applications, GNSS satellite signals strike the lens 111 and then are bent as they encounter the lens 103 and are refracted by the dielectric material from which the lens is constructed. Multiple feeds at different lateral locations behind the lens relative to the focal point of the lens produce multiple beams whose angles are determined by the lens design and position of the feed element 105.

A lens is any diffractive or refractive structure that concentrates or spreads energy. This includes the simple homogeneous dielectric lenses that are used for optical wavelengths and gather or spread light using the shape of the surface. The same principle applies at RF wavelengths. However, significantly greater performance (as measured in aperture efficiency and realized gain across a wide frequency range and field of view) can be achieved for a lens-based antenna when using more advanced lenses, such as metamaterial, metasurface, gradient index, or Diffractive Optical (DO) element lenses. The described system can use any suitable lens, though in the lens configurations described in U.S. Published Application No. 2018/0183152 permit considerably smaller lens size for a given wavelength of operation. U.S. Pat. No. 10,116,051, the entire contents of which are hereby incorporated by reference, offer particularly strong advantages, including wide scanning range, broadband operation, high efficiency and reduced size.

Any kind of RF radiator can be used as the feed 105, but particular feeds of interest will typically include patch antennas or waveguide antennas. This system is described as using patch antennas as the feed element 105 due to their many convenient properties (simple manufacture, compact, and planar), but can be implemented with other feed elements as well.

The primary benefits of a lens antenna for GNSS purposes is their high gain and multibeam properties. Any multiple beam antenna for GNSS will inherently have superior capabilities for mitigating multipath, interference, and jamming signals. Existing multibeam antennas for GNSS either use multiple distinct apertures tilted at different angles to cover the field of view or use a phased array with digital or analog beamforming techniques to steer beams at the desired satellites and/or nulls at targeted sources of interference. The lens antenna proposed here has the advantage of generating multiple beams in different directions from the same aperture area, defined by the lens 103, but does not require the power-hungry beamforming circuitry, since each feed naturally acts to cover a specified region of the sky through the passive beamforming of the lens while still making use of the entire antenna aperture. A lens 103 with planar bottom surface and approximately planar focal surface permits the feed elements 105 to be mounted on a single planar structure with inherently lower mutual coupling and easier manufacturing than existing multibeam antennas.

In the lens antenna, signals arriving from different directions will be propagated through the lens to different corresponding points below the lens. For example, referring to FIG. 2, a satellite signal coming from one direction (Beam 1) 111a will propagate and be received by feed antenna 1 located at feed position 1 105a. Simultaneously, a signal arriving from the direction of (Beam 2) 111b will propagate to feed position 2 where feed antenna 2 is located 105b.

Figure 3:
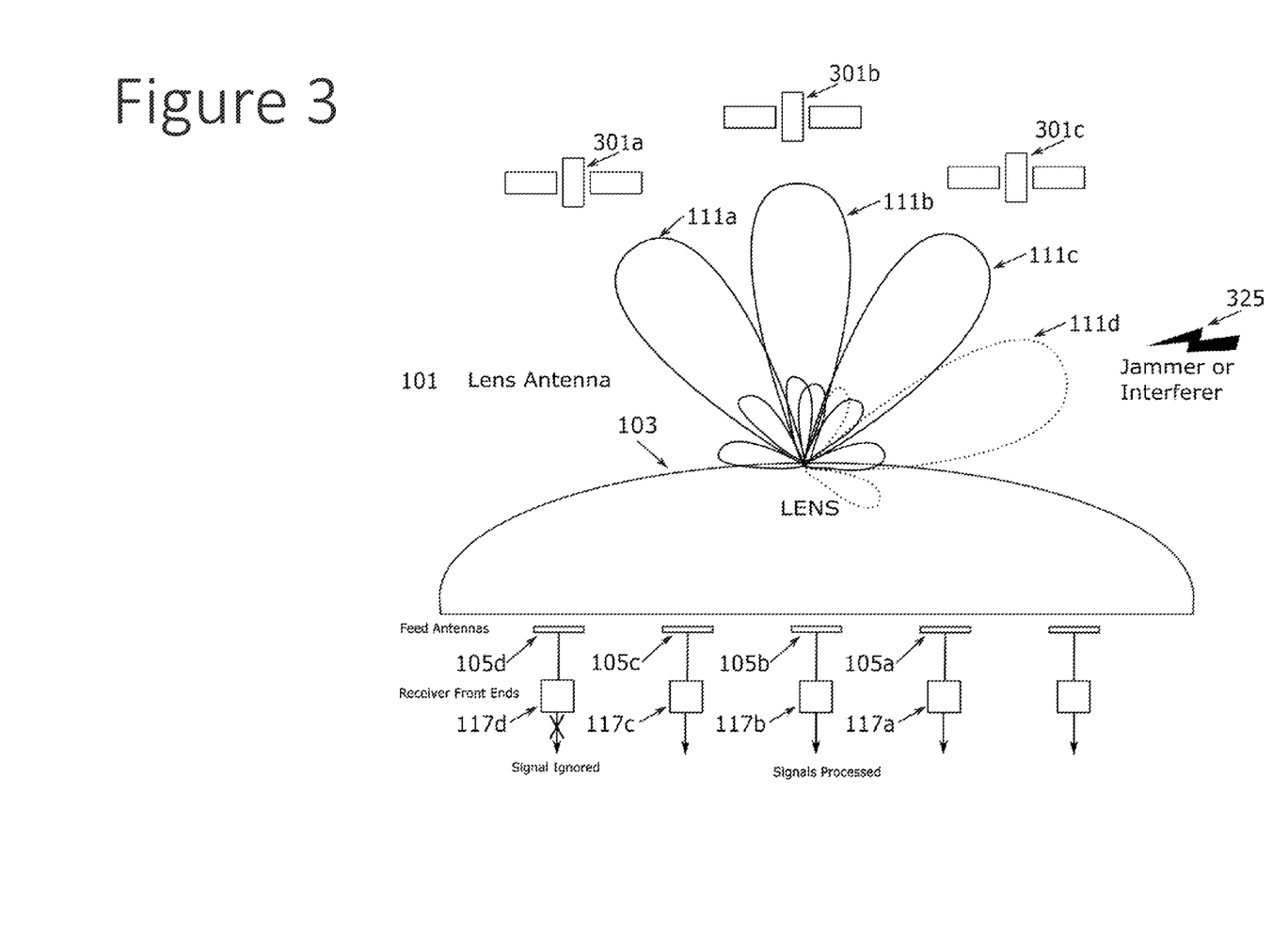
FIG. 3 shows a jammer signal or interference that is shown to be isolated by a single (or multiple) beam(s).

FIG. 3 shows a GNSS lens antenna 101 listening to satellites 301 in the presence of a jammer or other interferer 325. The signals from the different satellites are received by different beams 111a, 111b, 111c, 111d associated with separate feeds 105a, 105b, 105c, 105d and receivers 117a, 117b, 117c, 117d.

With this configuration, where the lens antenna uses individual feeds 105a, 105b, 105c to listen to satellites 301a, 301b, 301c, the jammer 325 (which might be intentional or unintentional) only impacts the received signal of a single beam 111d and feed 105d, and allows the remaining feeds 105a, 105b, 105c to continue operating. Compared to a phased array where all of the feeds in the antenna are used simultaneously to generate each beam, the same jammer 325 would be incident on all of the feeds and would potentially degrade the received signal from all of the beams. If the jammer were strong enough to saturate the front-end amplifier, then the entire antenna could in that case be effectively disabled.

However, in the multibeam lens antenna, a strong enough jammer 325 could disable a single receiver beam, but the remaining beams would continue to operate. This functionality can also be described as spatial filtering, since each beam is associated with a region, cone, or subset of the sky, Since the signals from each of the feeds 105 are processed independently, interference on one beam that prevents error-free reception of signals from one satellite will not impact reception of signals in different beams.

Figure 4:
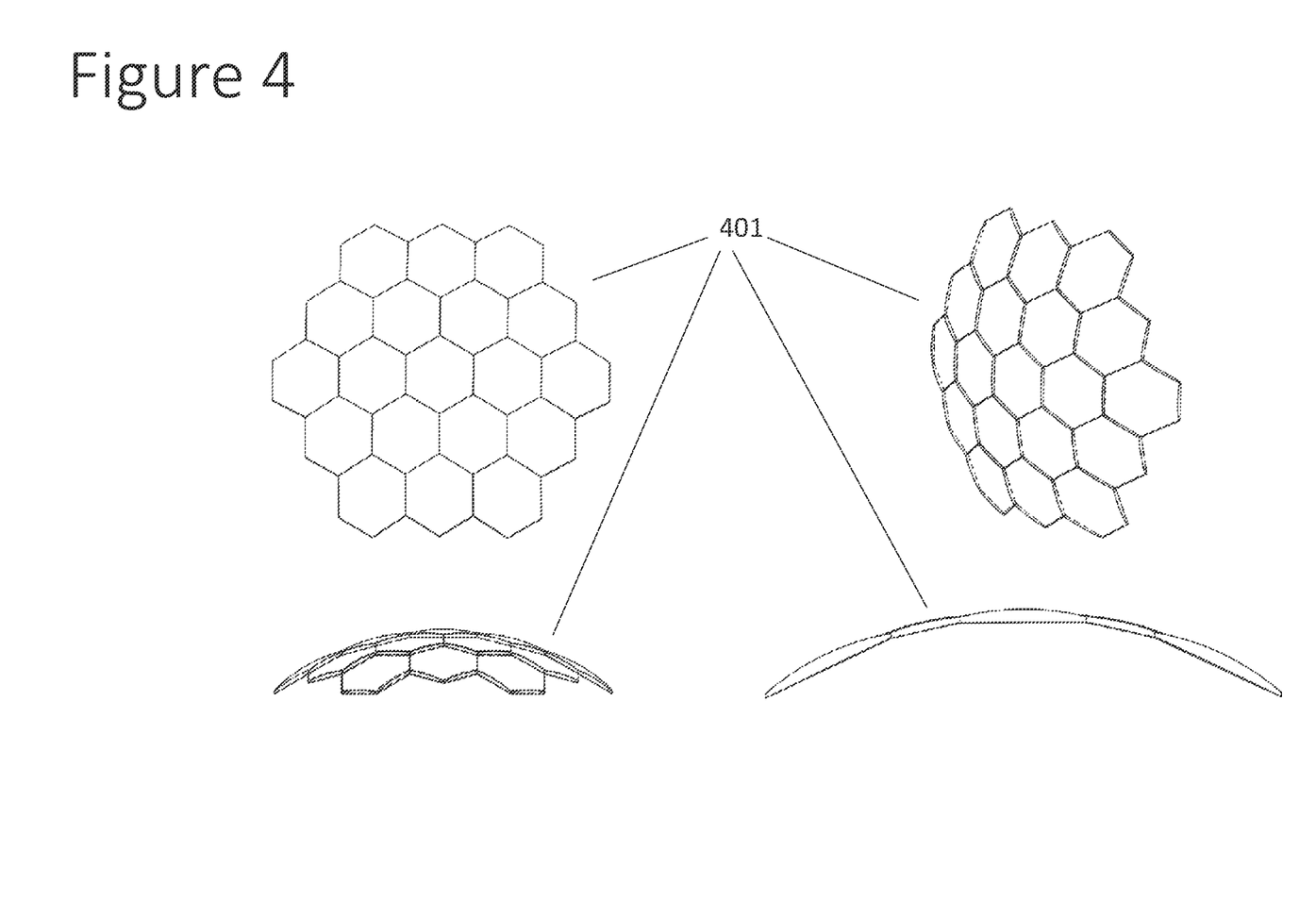
FIG. 4 shows multiple lenses employed as an array for additional directivity diversity.

FIG. 4 shows lenses 103 of multiple lens antennas 101 placed in a conformal shape 401 that can further extend the coverage range and performance compared to a single lens. The multiple antennas 101 in the array 401 would be configured to function cooperatively to form multiple beams and increase overall system gain and therefore received signal levels.

The lens-based GNSS antenna forms only one component of the system. The lens antenna is coupled with analog and digital signal processing circuitry to receive and interpret the signals from the satellites and compute the location and orientation of the antenna.

Figure 5:
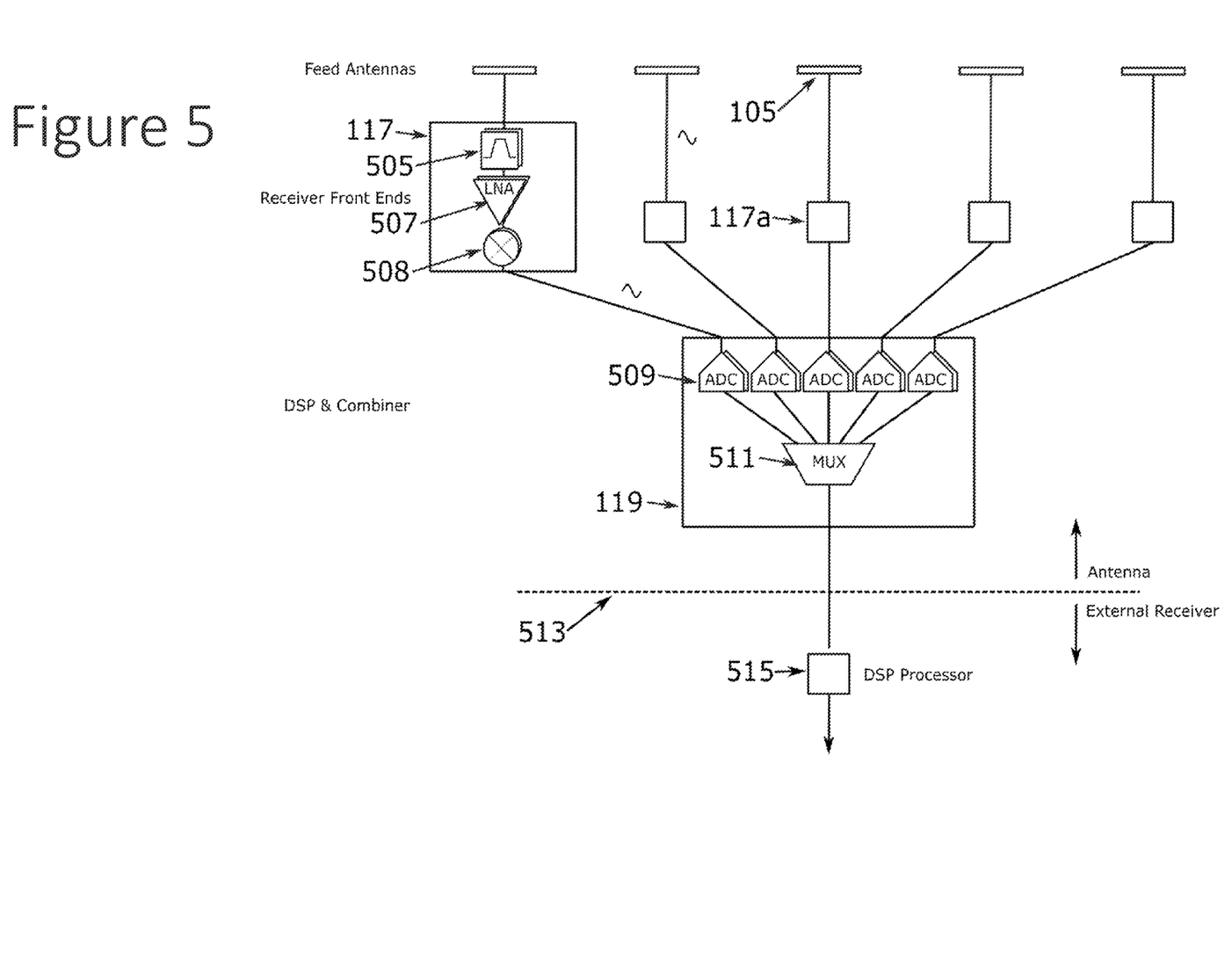
FIG. 5 is a block diagram of signal path from the lens to data combining.

FIG. 5 shows the circuit architecture for the lens GNSS lens antenna 101, which contains the feeds 105 and receiver front-ends 117 and signal processing circuitry 119, 515, jointly forming a GNSS receiver. The front-end receiver 117 is connected to the output of the feed 105, and has filters 505, low-noise amplifiers 507, and optionally mixers 508. Depending on the feed polarization, there can be either one or two of each component per feed to account for either dual-linearly-polarized feeds or single-circularly polarized feeds. The resulting signals from all feeds are then passed to the signal processing circuitry 119, where the signals are then sampled to digital bitstreams by the A/D converters 509, and combined with the signals from the other receiver front ends 117a by the multiplexer/combiner 511, which may sum the signals explicitly, or only combine the signals into a single bitstream for transport by the wired or wireless link to the signal processor 515. The lens 103, feeds 105, receiver front-ends 117, and combiner 119 are collocated as part of the antenna 101 by the requirement of minimizing loss and cabling complexity. The digital signal processing (DSP) processor 515 then forms the GNSS receiver as conventionally defined, that converts the satellite signals from the antenna into pseudo-range measurements and then a computed position. As in many conventional GNSS antennas, the first low-noise amplifiers and other front-end signal conditioning circuitry 117, 119 must be collocated with the antenna itself to minimize conductive losses and other distortions. Once the signal has been amplified and potentially digitized, a longer cable or other wired or wireless data path 513 can be used to run to an external processor 515 without loss of signal integrity.

There are several hardware complexities that accompany multibeam architectures. There are N beams 111 associated with N feed elements 105, and thus also N receiver front ends 117, including the filters SOS, LNAs 507, and possible down converters 508.

For this multibeam configuration, the phase centers 109 of each beam 111 will not, in general, be in the same location, either across scan angles or between beams. Because the phase center of the beam 111 is critical for computing positions based on signals from different satellites, any differences in the phase centers 199 from each beam 111 must be corrected or compensated for in the digital processor 515 before the signals may be used to compute a location estimate. The direction of arrival of each signal can be estimated with a high degree of accuracy by comparing the relative magnitude and time offset of the same signal received from adjacent feeds.

Figure 6A:
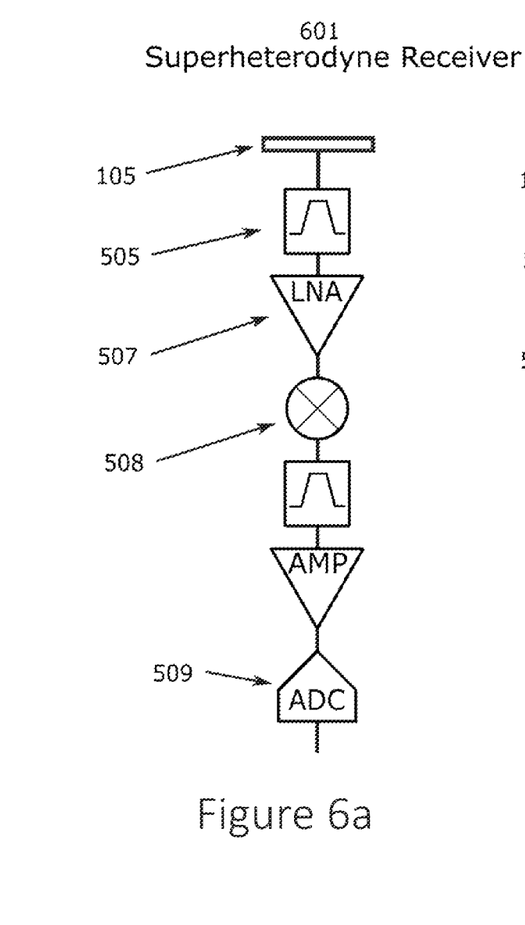
FIGS. 6a, 6b show two possibilities for the RF front-end, a superheterodyne and a direct-digital receiver (SDR).
Figure 6B:
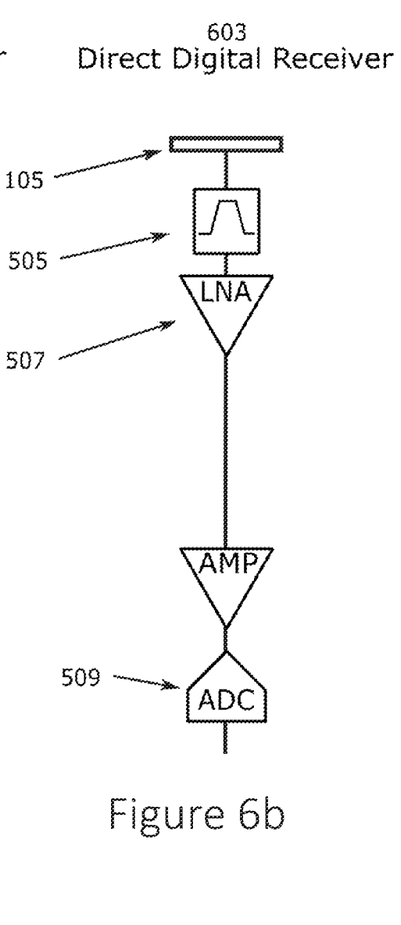

FIGS. 6a, 6b. show two example implementations for the RF front-end 117 and combiner 119 implementations, namely a superheterodyne receiver architecture 601 in FIG. 6a that includes a downconverting mixer 508 before the A/D converter 509, and a direct digital receiver architecture 603 in FIG. 6b that does not include a mixer. Both implementations are compatible with the disclosed system, and the decision between them may be based on component availability, cost, frequency responses, and filtering requirements. Both components have different advantages, but ultimately have the same interface to the signal processor 515 of a digital bitstream. Recent improvements in cost, power consumption, and sampling rate of Analog to Digital converters (ADC) allow for a direct sampling receiver, which reduces the analog circuitry required.

Figure 7:
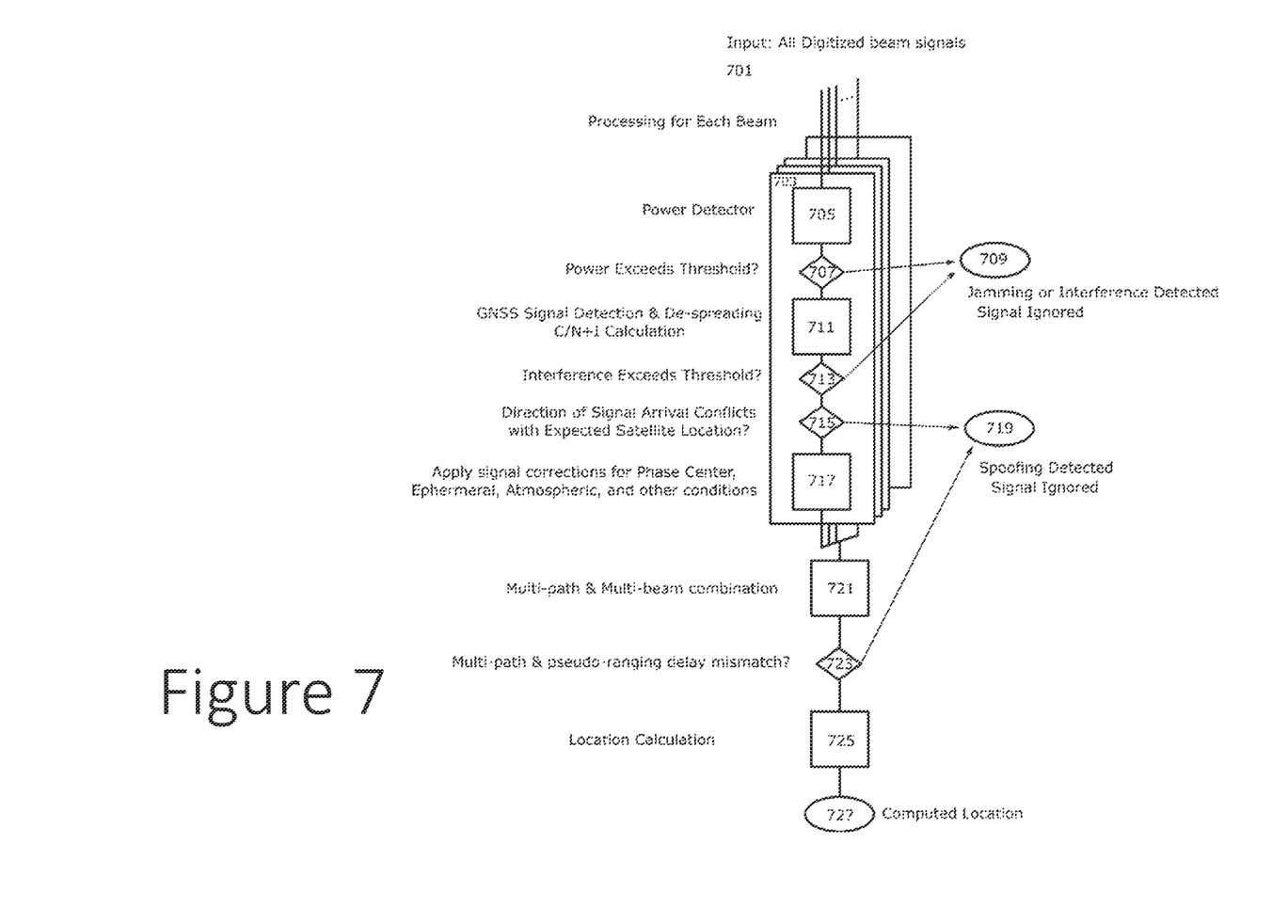
FIG. 7 is a flow chart for signal processing.

FIG. 7 shows a block diagram that illustrates the digital processing sequence 701 taking place in the digital signal processor 515. The digital processing functions can be performed by a processing device such as general-purpose processors, digital signal processors, or virtualized processors and signal processing circuits performed on an FPGA or other reconfigurable circuit. A control process will coordinate and command the subsidiary processes for each beam. In one embodiment, the steps 701 (including steps 703-727) are performed by the digital processor 515 (FIG. 5).

For each beam, the processing steps 703 (which include steps 705-717) are performed. Within the steps 703, the process begins with the digitized signal from the corresponding beam 111. A power detector 705 has an algorithm that is first used to detect and/or characterize the magnitude of the received signal. A comparator 707 then compares the signal strength against a predetermined threshold based on normal operation. If the power levels exceed the threshold, then jamming or other interference has been detected 709, and the signal from the corresponding beam is ignored.

If the power level does not exceed the threshold, then the signal is passed through a GNNS signal detection & de-spreading operation 711, which produces as its output signal level estimates in the form of carrier power to noise plus interference power (C/N+I) ratios and the detected and extracted signals themselves. A separate output is available for each extracted satellite signal detected as present in each beam, along with the corresponding C/N+I. The signal detection and de-spreading is performed in the same way as is done in ordinary GNSS receivers, with the distinction that the operation is repeated separately for each of the beams 111 of the multi-beam antenna 101. Signals from an individual satellite are received in one or more beams, and multiple beams will have different satellites present. The benefits of receiving fewer signals in each beam are that the beams have more gain to increase the received carrier power, and there would be fewer noise and interference sources in the reduced field of view of a single beam compared to the entire sky, thus reducing the interference term, Both effects have the effect of increasing the C/N+I ratio and thus improving the capability of the antenna and related receiver to successfully receive satellite signals.

A comparator 713 evaluates the C/N+I ratio for all of the detected and extracted signals, and determines whether any of the signals exceed a predetermined threshold of normal operation and represents a jamming or other interference signal 709. If the threshold is exceeded, it is determined that the signal is a jamming or interference signal, and the signal is ignored, step 709.

If the threshold is not exceeded, a further comparator 715 evaluates the direction of arrival of each detected signal coarsely from the individual beam coverage area and compares this measured direction of arrival with the expected satellite location based on the current time and the known satellite ephemeris. Mismatches between the expected and actual direction of arrival of the signals over and above a predefined threshold indicate the presence of a spoofing signal 719, and the signal is ignored by the further processing steps.

If there are no mismatches, the signals are corrected 717 for the phase center of the current feed 105 and beam 111. Additional corrections common to all GNSS receivers, including correction for atmospheric conditions, ephemeral data, those obtained from DGPS, RTK, PPP or other GNSS error correction mechanisms, and other conditions are also applied by 717.

The signals received and processed in parallel from all of the feeds (i.e., all of the steps 703 conducted for each beam) are then combined into one data set to be processed together in the remaining steps. The list of extracted signals across all of the beams are de-duplicated in step 721, by the processor 515. Cases where the signals from the same satellite are received and extracted by multiple beams are removed and replaced either by an amalgamated signal having the weighted and delayed sum of the signals from each of the beams, or more simply by the strongest of the individual signals. In cases where the separate polarizations (left and right-hand circularly polarized) are received and processed independently from the feeds 105 through to the processor 515, signals in the same beam but opposite polarization can be used to detect incidence of multipath or ground reflections, which ordinarily result in significant errors in the computed locations of a GNSS receiver.

Explicit detection and measurement of the cross-polarized signals can be used to either exclude the signals subject to multipath and reflections from consideration, or with the support of multipath propagation models can be used to strengthen and correct the primary signal, once the polarization and time offset are applied to make corrections according to the multi-path propagation models. After the de-duplication and signal combination steps are complete, only a single copy of each signal is retained and used to compute pseudo-range data for each extracted satellite signal. The set of duplicate signals for each satellite from different beams removed during the de-duplication process are used to measure (with more precision than 715) the direction of arrival of the satellite signal by examining the relative magnitude and delay (phase and time) between of signals received from the same satellite into multiple beams. The measured direction of arrival is then compared 723 to the satellite ephemeris data to determine whether there are any mismatches between a received signal and the expected satellite location, and mismatches above a predetermined threshold result in the signal being ignored as a possible spoofing signal 719.

Finally, the remaining signals (that have not been eliminated due to detected jamming 709 or spoofing 719) are used by the processor 515 in the location calculation algorithm 725 to compute the current estimated location of the antenna 727.

The majority of GNSS satellites are in non-geostationary orbits (NGSO), such as LEO, MEC, HEO, etc., and so move relative to the ground. Merely from the satellite motion, or from the movement of the antenna 101, which satellite signals are received by which beams will change over time, and there will be discrete periods of time (handoff or handover) in which the same signal is received by multiple beams. This case is handled by the multipath combination process 721 that monitors for copies of the same signal from multiple feeds and operates to generate a single signal from two or more (potentially weak) signals. The C/N+I of each of the signals can be used by the multipath combiner 721 to decide which to use and which to ignore, or how to combine the signals. As the C/N+I ratio decreases in one beam 111a and increases in an adjacent beam 111b, a soft handoff may be implemented by combining by summation with time-delay to maximize the correlation of the two signals and gradually shifting the demodulated signal response from one beam to another. The alternative method is a hard handoff, where the output of the combiner 721 is chosen as the single strongest signal.

If the GNSS receiver/antenna is kinematic, another level of complexity exists. The antenna is changing position and orientation with time, and so signals received at different times, from the same or different satellites, are received while the antenna is in different locations. This is solved by using Gyroscopes and Accelerometers to form an Inertial Motion Unit (IMU) that inertially tracks the relative movement of the terminal accurately over short time scales (1-120 sec). In these cases, successive measurements of satellite pseudo-range are corrected in the location calculations 725. In such cases, the "place" in the PRN code that has locked the de-spreader is "remembered" by the tracking PLL and switched between or among multiple correlators for constant tracking.

The capability of the antenna for use in kinematic applications can be extended by tracking the orientation as well as the location of the terminal, and correlating the orientation of the terminal against the relative directions of the satellites. As the terminal and the satellites move and reorient relative to each other, the beam(s) receiving the signals from a particular satellite will change over time. If each of the detection processes 711 for each beam are completely independent, then a single changing between feeds would require re-detection of the satellite and synchronization in the new beam. Instead, the solution is to share the loop tracking parameters and offsets between beams for each satellite in view, so that a new signal received into a neighboring beam can start processing based on the existing locked beam, while still allowing the PLL for each beam to shift relative to each other to account for multipath, reflections, and phase center differences.

An additional implementation can change what is done with detected jamming and spoofed signals, rather than ignoring the signals outright. Very strong jamming or interference can affect the signals from multiple adjacent beams, not only the single beam directed most closely. A detected interference or spoofing signal can then be used by an interference cancelation system to cancel or subtract the undesired signal(s) from the desired signals received by neighboring feeds. This can also be interpreted as null-placement or beamforming; by subtracting signals received in one beam from a neighboring beam with an appropriate magnitude and phase offset, the effective radiation pattern of the neighbor beam can be modified to reduce sensitivity to the signal from the undesired direction.

Considerable improvement in gain is realized compared to omni-directional antennas since narrow beams also exhibit high directivity. The lens antenna is also very efficient and thus little gain is sacrificed compared to directivity.

This increases the C/N+I ratios for all satellite signals received and thus improves the two most important GNSS receiver parameters: location accuracy and reduced time for an accurate location measurement. When a jamming signal is present, a single beam isotropic antenna can be rendered useless as the front end, particularly when the LNA is overloaded. This is also the case in phased arrays, since all antenna elements and their associated LNAs must handle ALL signals incident on the array. With multibeam antennas, the beams themselves reject signals off-beam, therefore the only beams that are overloaded are the beams that include the direction(s) of the jammer(s).

Lenses can be produced from multiple materials and constructions, etc. (metamaterial, dielectric, metasurface, Fresnel, transformation optics, stepped gradient, homogeneous, GRIN, etc.). The lenses for implementing a lens-based GNSS antenna can be built by 3D printing, injection molding, machining, casting, thermoforming, shaped foams, multilayer stacks of plastic with holes cut into it, or other methods. The lenses may be spherical, as in the Luneburg lens, or non-spherical or substantially planar. The substantially planar or non-spherical case is desirable as it leads to a simpler and more cost-effective feed architecture (allowing for planar printed circuit board implementations, rather than something more complex for a spherical lens).

An extension of the GNSS antenna is to include bidirectional communications (transmit and receive capability) within the neighboring L-band communications channels, in addition to the GNSS reception capability within a single lens antenna. This case where single antenna unit can provide both GNSS navigation & time services as well as bidirectional satellite communications is beneficial for platforms with limited surface area for antennas. This implementation would include broader-bandwidth receive amplifiers, transmit amplifiers, as well as filters with higher isolation to enable operation of the transceiver while maintaining lock on the GNSS satellites. The benefits described of the system for the GNSS receiver application would also exist for the L-band SATCOM transceiver antenna for use with services such as Iridium or BGAN, namely, higher gain, reduced sensitivity to interference and spoofing, and reduced interference between satellite signals due to being received in multiple beams simultaneously.

There are several possible form factors for the lens-based GNSS antenna and receiver. In most implementations, the front ends 117 and combiner 119 will be co-located with the antenna. The balance of the rest of the system (including the DSP processor 515) can also be contained within the same structure thus creating a "single piece" multibeam antenna and receiver system. Alternatively, especially where weight is a major factor, the digitized outputs of the antenna can be combined 119 and sent either through a cable or a wireless connection 513 to the digital signal processor. In some applications ever greater system distribution may be optimum.

A key innovation of the described radio frequency lens-based GNSS antenna is the use of the lens to generate multiple disjoint beams across the field of view of the antenna, and then process the extracted signals from each beam separately. Across all of the beams, the signals from all satellites within line-of-sight are received. This configuration is in contrast to conventional phased array-based GNSS antennas that use either null-placement or beam-tracking methods to attenuate identified interferes or to follow individual satellites. The use of fixed beams to cover the sky increases the antenna gain and therefore the signal level, reduces sky noise (and discrete interference sources), and does not require beamforming or steering to be performed, simplifying the antenna. Advancements in signal processing capability and falling cost and power requirements make this architecture feasible, since it does require more signal processing resources to accomplish. Other high-gain or array-based GNSS antennas combine the received signals together after beamforming, which eliminates the benefit of receiving the individually lower-noise signals from different sectors of the sky. This system allows reception from satellites close to the horizon, while still allowing for mitigation of ground-level jamming and spoofing sources, in comparison to conventional high-availability approaches that instead rely on reducing antenna gain at the horizon and limiting the field of view of the antenna.

Any signal processing approach that leads to improved performance (including, but not limited to time-domain signal cancellation, kinematics post-processing, position integration) that can be applied to another GNSS antenna can be applied to this one.

Applications

Since the antenna described will offer the possibility of high performance, nearly every application that demands high performance can utilize this technology. Among them are: Cadastral surveying, Construction surveying and machine control, Mine surveying, Agriculture surveying and machine control, Autonomous vehicle (including automobiles), Marine surveying, Ship navigation, Aircraft navigation, Transportation, Law Enforcement, Base station, and Time references. The antenna supports multiple specific frequencies selected from L1, L3, L5 for GPS, GLONASS, Galileo and GNSS standards.

The foregoing description and drawings should be considered as illustrative only of the principles of the disclosed embodiments. The system and method may be configured in a variety of shapes and sizes and is not intended to be limited by the embodiment. Numerous applications of the systems disclosed will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. An antenna comprising:
    a radio frequency lens;
    a plurality of feeds separately providing a plurality of directive beams from a single shared aperture of the radio frequency lens, the plurality of feeds having a field of view and wherein the plurality of directive beams are from different directions within the field of view; and
    a processing device to:
        detect one or more signals from individual beams of the plurality of directive beams;
        extract the detected signals from the plurality of individual beams;
        determine one or more duplicate signals present in extracted signals;
        remove the one or more duplicate detected signals to retain distinct detected signals to be processed; and
        process the retained signals together to determine a time and a position of the antenna.

2. The antenna of claim 1, wherein the antenna supports multiple specific frequencies selected from L1, L3, L5 for GPS, GLONASS, Galileo and GNSS standards.

3. The antenna of claim 1, wherein the antenna is broadband.

4. The antenna of claim 1, wherein the antenna supports bidirectional L-band communication from the radio frequency lens using a network such as Iridium or BGAN.

5. The antenna of claim 1, the processing device to measure a direction of arrival of a signal from a satellite by monitoring a relative signal strength and a delay for a satellite signal into multiple of the plurality of feeds.

6. The antenna of claim 5, wherein an expected direction of arrival of a satellite signal based on constellation ephemeris data is compared against a measured direction of arrival, and discards the signal if there is a mismatch between the expected direction of arrival and the measured direction of arrival, as a potential spoofed and/or jammer/interference signal.

7. The antenna of claim 6, wherein the mismatch is determined if the expected direction of arrival differs from the measured direction of arrival by more than a predetermined threshold.

8. The antenna of claim 1, the processing device to separately process independent signals for differing polarization provided by individual feeds of the plurality of feeds.

9. The antenna of claim 8, the processing device to detect, using independent signals for differing polarization, and discard or correct signals impacted by multipath and reflections from the ground and environment.

10. The antenna of claim 1, the processing device to monitor signal power of the individual beams.

11. The antenna of claim 10, the processing device to discard signals with abnormal signal power as due to jamming or interference.

12. The antenna of claim 11, the processing device to determine jamming or interference if the signal power exceeds a predetermined threshold.

13. The antenna of claim 1, wherein each of the plurality of directive beams has a different phase center location.

14. The antenna of claim 13, the processing device to determine by calibration the phase center locations of the individual beams.

15. The antenna of claim 1, wherein the plurality of feeds are below the radio frequency lens at different positions.

16. The antenna of claim 1, wherein the radio frequency lens is non-spherical.

* * * * *